(12) United States Patent
Ishikawa

(10) Patent No.: US 9,138,931 B2
(45) Date of Patent: Sep. 22, 2015

(54) COLLECTOR DEVICE, NON-WOVEN FABRIC MANUFACTURING APPARATUS, AND NON-WOVEN FABRIC MANUFACTURING METHOD

(75) Inventor: Kazunori Ishikawa, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 99 days.

(21) Appl. No.: 14/234,283

(22) PCT Filed: Jun. 29, 2012

(86) PCT No.: PCT/JP2012/004237
§ 371 (c)(1),
(2), (4) Date: Jan. 22, 2014

(87) PCT Pub. No.: WO2013/014861
PCT Pub. Date: Jan. 31, 2013

(65) Prior Publication Data
US 2014/0131907 A1 May 15, 2014

(30) Foreign Application Priority Data

Jul. 22, 2011 (JP) ................................. 2011-161175

(51) Int. Cl.
*D04H 1/728* (2012.01)
*D01D 5/04* (2006.01)
*B29C 47/00* (2006.01)
*D01D 5/00* (2006.01)

(52) U.S. Cl.
CPC .......... *B29C 47/0076* (2013.01); *D01D 5/0076* (2013.01); *D01D 5/0092* (2013.01); *D04H 1/728* (2013.01)

(58) Field of Classification Search
None
See application file for complete search history.

(56) References Cited

U.S. PATENT DOCUMENTS

| 8,186,987 B2* | 5/2012 | Sumida et al. .................. 425/73 |
| 2007/0051841 A1 | 3/2007 | Mori |
| 2010/0028553 A1 | 2/2010 | Maly et al. |
| 2012/0013047 A1 | 1/2012 | Ishikawa et al. |
| 2012/0282411 A1* | 11/2012 | Kurokawa et al. ............ 427/462 |

FOREIGN PATENT DOCUMENTS

| JP | 2007-99257 | 4/2007 |
| JP | 2008-190090 | 8/2008 |

(Continued)

OTHER PUBLICATIONS

International Search Report issued Aug. 14, 2012 in International (PCT) Application No. PCT/JP2012/004237.

(Continued)

*Primary Examiner* — Mary F Theisen
(74) *Attorney, Agent, or Firm* — Wenderoth, Lind & Ponack, L.L.P.

(57) ABSTRACT

A collector device of a non-woven fabric manufacturing apparatus electrostatically attracts and stacks fibers charged at a first electrical polarity on a front surface of a base sheet. The collector device comprises an electrode disposed to face a back surface of the base sheet at a distance, the electrode is supplied with a voltage having a second electrical polarity opposite to the first electrical polarity or grounded, and a plurality of charge holding members positioned between the base sheet and the electrode. The charge holding members serially come in contact with and get away from the back surface of the base sheet at random.

16 Claims, 12 Drawing Sheets

(56) References Cited

FOREIGN PATENT DOCUMENTS

| | | |
|---|---|---|
| JP | 2008-196061 | 8/2008 |
| JP | 2008-223187 | 9/2008 |
| JP | 2009-52163 | 3/2009 |
| JP | 2009-275326 | 11/2009 |
| JP | 2010-518265 | 5/2010 |
| JP | 2011-80186 | 4/2011 |

OTHER PUBLICATIONS

Written Opinion of the International Searching Authority issued Aug. 14, 2012 in International (PCT) Application No. PCT/JP2012/004237.

International Preliminary Report on Patentability and Written Opinion of the International Searching Authority issued Feb. 6, 2014 in International (PCT) Application No. PCT/JP2012/004237.

* cited by examiner

COLLECTOR DEVICE, NON-WOVEN FABRIC MANUFACTURING APPARATUS, AND NON-WOVEN FABRIC MANUFACTURING METHOD

TECHNICAL FIELD

The present invention relates to a collector device for stacking fibers made by electrospinning on a base sheet, a non-woven fabric manufacturing apparatus comprising the collector device, and a non-woven fabric manufacturing method.

BACKGROUND ART

Conventionally, it has been practiced that nano-order or micro-order fibers are made by electrospinning, and the electrospun fibers are stacked on a surface of a base sheet. For example, the fibers are made by electrostatically exploding fiber raw material liquids positively-charged.

For stacking the fibers on the surface of the base sheet, it is necessary to electrically neutralize positively-charged fibers having previously stacked on the base sheet by using a collector device. Consequently, an electrostatic repulsion between the positively-charged fibers having previously stacked on the base sheet and the subsequent positively-charged fibers is avoided.

For example, the non-woven fabric manufacturing apparatus described in Patent Document 1 comprises a collector device having a plate-like collecting electrode plane-contacting with a back surface of the base sheet and a voltage supplying device for supplying a negatively-voltage to the collecting electrode. For example, the non-woven fabric manufacturing apparatus described in Patent Document 2 comprises a belt-like collecting electrode plane-contacting with the back surface of the base sheet. According to such collector devices, fibers having previously stacked on the surface of the base sheet are electrically neutralized.

Additionally, the collecting electrode of the collector device functions to electrostatically attract positively-charged fibers to the base sheet. Specifically, the collecting electrode supplied with a negative voltage plane-contacts with the back surface of the base sheet and thereby cause a dielectric polarization by which positive charges are collected at the back surface side and negative charges are collected at the front surface side of the base sheet. Due to the dielectric polarization of the base sheet, the positively-charged fibers are electrostatically attracted to the front surface of the base sheet. Consequently, the fibers are attracted to the front surface of the base sheet.

Patent Document(s)

Patent Document 1: Japanese Laid-Open Patent Publication No. 2011-80186
Patent Document 2: Japanese Laid-Open Patent Publication No. 2008-196061

SUMMARY OF THE INVENTION

Problems to be Solved by the Invention

However, in the collector devices described in the Patent documents 1 and 2, the positive charges are collected at the back surface side of the base sheet due to the dielectric polarization of the base sheet. Therefore, the back surface of the base sheet strongly electrostatically attaches to the collecting electrode supplied with a negative voltage. Consequently, it is difficult to feed the base sheet from the collector device.

In view of the above, the present invention is intended to improve the feed capability of the base sheet in a non-woven fabric manufacturing apparatus in which fibers made by electrospinning are stacked on the base sheet.

Means to Solve the Problems

In order to achieve the above object, the present invention has the following constitutions.

According to a first aspect of the present invention, there is provided a collector device of a non-woven fabric manufacturing apparatus for electrostatically attracting and stacking fibers charged at a first electrical polarity on a front surface of a base sheet, the collector device comprising:

an electrode disposed to face a back surface of the base sheet at a distance, the electrode being supplied with a voltage having a second electrical polarity opposite to the first electrical polarity or grounded, and a plurality of charge holding members positioned between the base sheet and the electrode, wherein the charge holding members serially come in contact with and get away from the back surface of the base sheet at random.

According to a second aspect of the present invention, there is provided the collecting device according to the first aspect, wherein the charge holding members come in contact with the back surface of the base sheet in spots.

According to a third aspect of the present invention, there is provided the collecting device according to the first or second aspect, wherein the charge holding members are granular members.

According to a fourth aspect of the present invention, there is provided the collecting device according to the first or second aspect, wherein the charge holding members are strip-shaped or threadlike members having free ends contactable with the base sheet and the electrode.

According to a fifth aspect of the present invention, there is provided the collecting device according to the first or second aspect, further comprising tubular guide members extending from the electrode to the base sheet and restricting moving directions of the charge holding members by containing the charge holding members therein.

According to a sixth aspect of the present invention, there is provided a non-woven fabric manufacturing apparatus for stacking fibers made by electrospinning on a front surface of a base sheet, the non-woven fabric manufacturing apparatus comprising:

a sheet feeding device feeding the base sheet, a nozzle ejecting a polymer solution and disposed at a front surface side of the base sheet, an electrode disposed to face a base surface of the base sheet at a distance, a charging device charging the polymer solution ejected from the nozzle by supplying a potential difference between the nozzle and the electrode, and a plurality of charge holding members positioned between the base sheet and the electrode, wherein the charge holding members serially come in contact with and get away from the back surface of the base sheet at random.

According to a seventh aspect of the present invention, there is provided the non-woven fabric manufacturing apparatus according to the sixth aspect, wherein the charge holding members come in contact with the back surface of the base sheet in spots.

According to an eighth aspect of the present invention, there is provided the non-woven fabric manufacturing apparatus according to the sixth or seventh aspect, wherein the charge holding members are granular members.

According to a ninth aspect of the present invention, there is provided the non-woven fabric manufacturing apparatus according to the sixth or seventh aspect, the charge holding members are strip-shaped or threadlike members having free ends contactable with the base sheet and the electrode.

According to a tenth aspect of the present invention, there is provided the non-woven fabric manufacturing apparatus according to the sixth or seventh aspect, further comprising tubular guide members extending from the electrode to the base sheet and restricting moving directions of the charge holding members by containing the charge holding members therein.

According to an eleventh aspect of the present invention, there is provided the non-woven fabric manufacturing apparatus according to any one of the sixth to tenth aspect, wherein the base sheet is above the electrode.

According to a twelfth aspect of the present invention, there is provided a non-woven fabric manufacturing method for stacking fibers made by electrospinning on a front surface of a base sheet, the non-woven fabric manufacturing method comprising:

positioning a plurality of movable charge holding members between the base sheet and an electrode disposed to face a back surface of the base sheet at distance, stacking the fibers charged at a first electrical polarity by electrospinning on the front surface of the base sheet, by supplying the electrode with a voltage having a second electrical polarity opposite to the first electrical polarity or grounding the electrode, electrically neutralizing a part of the base sheet, and electrostatically attracting the fibers to the electrically-neutralized part of the base sheet, wherein the electrically neutralizing and electrostatically attracting are achieved by randomly repeating a cycle including;

the charge holding members are charged at the second electrical polarity by the electrode, the charged charge holding members come in contact with the back surface of the base sheet, and the charge holding members get away from the back surface of the base sheet in order to be re-charged by the electrode.

According to a thirteenth aspect of the present invention, there is provided the non-woven fabric manufacturing method according to the twelfth aspect, wherein the charge holding members come in contact with the back surface of the base sheet in spots.

According to a fourteenth aspect of the present invention, there is provided the non-woven fabric manufacturing method according to the twelfth or thirteenth aspect, wherein the charge holding members are granular members.

According to a fifteenth aspect of the present invention, there is provided the non-woven fabric manufacturing method according to the twelfth or thirteenth aspect, wherein the charge holding members are strip-shaped or threadlike members having free ends contactable with the base sheet and the electrode.

According to a sixteenth aspect of the present invention, there is provided the non-woven fabric manufacturing method according to the twelfth or thirteenth aspect, further using tubular guide members extending from the electrode to the base sheet and restricting moving directions of the charge holding members by containing the charge holding members therein.

Effects of the Invention

According to the present invention, the base sheet is not substantially contacted with the collector device, i.e., the base sheet is not plane-contacted with the collector device and not strongly electrostatically attached to the collector device, thereby improving a feed capability of the base sheet.

BRIEF DESCRIPTION OF THE DRAWINGS

The above construction and features of the present invention will become apparent from the following description of preferred embodiments thereof with reference to the accompanying drawings, wherein.

EMBODIMENTS FOR CARRYING OUT THE INVENTION

Hereinbelow, embodiments of the present invention will be described with reference to the accompanying drawings.

Figure 1:
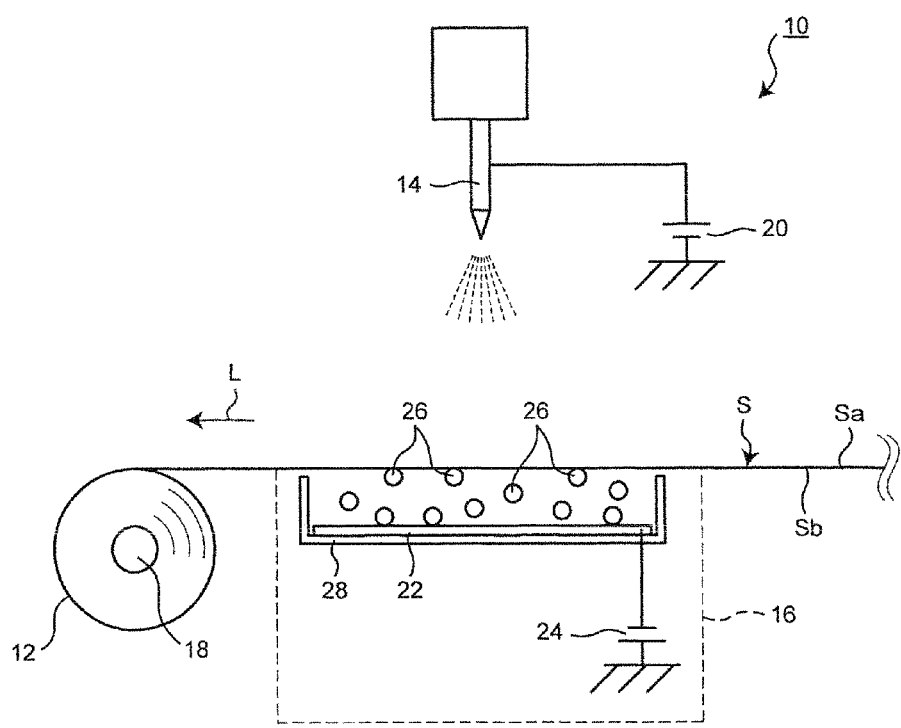
FIG. 1 is a schematic view of a non-woven fabric manufacturing apparatus comprising a collector device according to an embodiment of the present invention.

FIG. 1 shows is a schematic view of a non-woven fabric manufacturing apparatus according to an embodiment of the present invention. The non-woven fabric manufacturing apparatus shown in FIG. 1 is configured to manufacture a non-woven fabric by stacking fibers made by electrospinning on a front surface of a base sheet.

It is noted here that the term "fiber" herein refers to a filamentous substance formed from polymeric materials and having nano-order or micron-order diameters. The polymeric material may be various high polymers such as petroleum polymers and biopolymers including polyvinylidene fluoride (PVDF), polyvinylidene fluoride-co-hexafluoropropylene, polyacrylonitrile, polymethyl methacrylate, polyethylene, polypropylene and the like, as well as their copolymers and mixtures or the like. The nanofiber raw material liquid is a solution in which those polymeric materials have been dissolved (polymer solution).

As show in FIG. 1, the non-woven fabric manufacturing apparatus 10 includes a sheet feeding device 12 for feeding the base sheet S, a plurality of nozzles 14 for ejecting charged fiber raw materials liquids toward the base sheet S, and a collector device 16 for electrostatically attracting the fibers to the base sheet S.

The base sheet S is a continuous sheet. The sheet feeding device 12 is configured to feed the base sheet S in a feed direction L corresponding to a longitudinal direction thereof. For example, the sheet feeding device 12 includes a roller 18 for reeling the base sheet S.

The nozzles 14 are a part of an electrospinning device for making fibers by electrospinning. The nozzles 14 are disposed above the base sheet S and at a front surface Sa side thereof. The nozzles 14 are apart from the front surface Sa of the base sheet S at a specified distance. Also, the nozzles 14 are arranged interspatially in a width direction of the base sheet S (a vertical direction of the drawing). Each nozzle 14 is supplied with a high voltage having a positive electrical polarity (e.g., voltage from +5 kV to +100 kV) by a voltage supplying device 20. Therefore, the positively-charged fiber raw material liquids are ejected from the nozzles 14 toward the front surface Sa of the base sheet S.

Each nozzle 14 may include one ejecting orifice for ejecting the fiber raw material liquid. Alternatively, one nozzle including a plurality of ejecting orifices may be used.

The positively-charged fiber raw material liquid ejected from each nozzle 14 repeats an electrostatic explosion due to shortening distances between charges therein. This reason is that the solution thereof is evaporated gradually until reaches the front surface Sa of the base sheet S. Fibers are made by the electrostatic explosion and thus stacked on the front surface Sa of the base sheet S.

The collector device 16 is disposed below the base sheet S and includes an electrode 22, a voltage supplying device 24 for supplying the electrode 22 with a voltage, a plurality of charge holding members 26, and a container 28 for containing the charge holding members 26 therein.

The collector device 16 functions as an attracting device for attracting (electrostatically attracting) the charged fibers (or the charged fiber raw material liquids) to the base sheet S, a charging device for charging fiber raw material liquids by concentrating charges on the nozzles 14, and an electrical neutralizing device for electrically neutralizing the base sheet S and fibers stacked thereon.

The collector device 16 includes the electrode 22 and thus can functions as the attracting device and the charging device. Specifically, the electrode 22 is a plate-like electrode and disposed to face a back surface Sb of the base sheet S at a distance. The electrode 22 is supplied with a high voltage having a negative electrical polarity (e.g., voltage from −35 kV to −5 kV) by the voltage supplying device 24.

Since the electrode 22 is supplied with a negative voltage, the positively-charged fibers are electrostatically attracted to the base sheet S. Additionally, positive charges in nozzles 14 are concentrated on tips thereof having the ejecting orifices for ejecting fiber raw material liquids so that the fiber raw material liquids are positively-charged.

The voltage supplied to the electrode 22 may be a voltage capable of attracting the charged fibers to the base sheet S, and providing between the nozzles 14 and the electrode 22 with a potential difference for concentrating charges on the nozzles 14 so that fiber raw material liquids are positively-charged.

Consequently, the collector device 16 can function as the attracting device and the charging device. Therefore, if the nozzles 14 are supplied with the high voltage having the positive electrical polarity as the embodiment, the electrode 22 may be grounded. Alternatively, for example, the nozzles 14 may be grounded and thus the electrode 22 may be supplied with a voltage. The following explanation is based on the premise that the electrode 22 is supplied with a voltage having a negative electrical polarity.

The charge holding members 26 are freely-movable and positioned between the base sheet S and the electrode 22 of the collector device 16. Therefore, the collector device 16 can have a function to electrically neutralize. Specifically, the charge holding members 26 are contained in the container 28 having an opening facing the base sheet S and a bottom on which the electrode 22 is disposed, so as to not drop out of the electrode 22, i.e., to keep between the electrode 22 and the base sheet S.

The charge holding members 26 are granular members made from a material capable of holding charges, but not limited to a conductive material and an insulating material. For example, the charge holding members 26 may be granular members having a substantial spherical shape and made from aluminum. Also, the charge holding members 26 have a size unable to pass through the base sheet S and thus be captured by the base sheet S.

Hereinbelow, a function of the collector device 16 will be explained with reference to simple models of the collector device 16 shown in FIGS. 2A-2F.

Figure 2A:
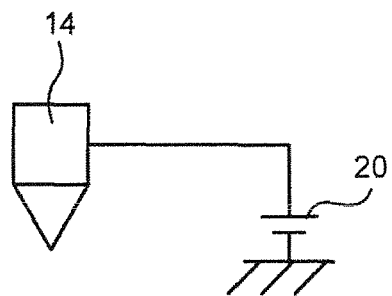
FIG. 2A-2F are views for explaining a function of the collector device shown in FIG. 1.
Figure 2A:
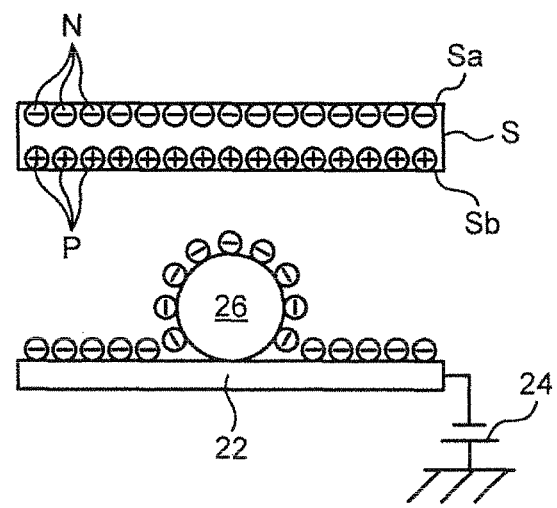

Firstly, as shown in FIG. 2A, before the nozzle 14 ejects the fiber raw material liquid, the electrode 22 of the collector device 16 is supplied with a high voltage having a negative electrical polarity by the voltage supplying device 24. A dielectric polarization is caused thereby in the base sheet S. Specifically, positive charges P are collected at the back surface Sb side of the base sheet S facing to the electrode 22, while negative charges N are collected at the front surface Sa side thereof. A charge holding member 26 contacting with the electrode 22 is negatively-charged (the charge holding member 26 holds negative charges N).

Figure 2B:
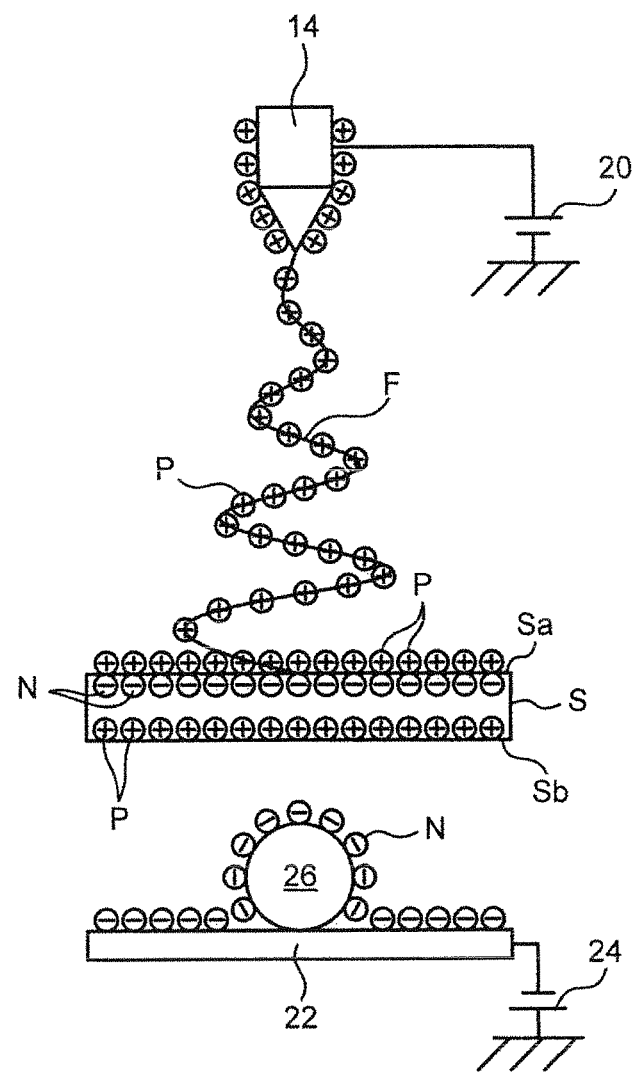

Secondly, as shown in FIG. 2B, the positively-charged fiber raw material liquid is ejected from the nozzle 14. The fiber raw material liquid ejected from the nozzle 14 repeats an electrostatic explosion. Consequently, Fibers F are made. The positively-charged fibers F are electrostatically attracted to the front surface Sa of the base sheet S at which the negative charges N are collected and then stacked on the front surface Sa of the base sheet S.

Figure 2C:
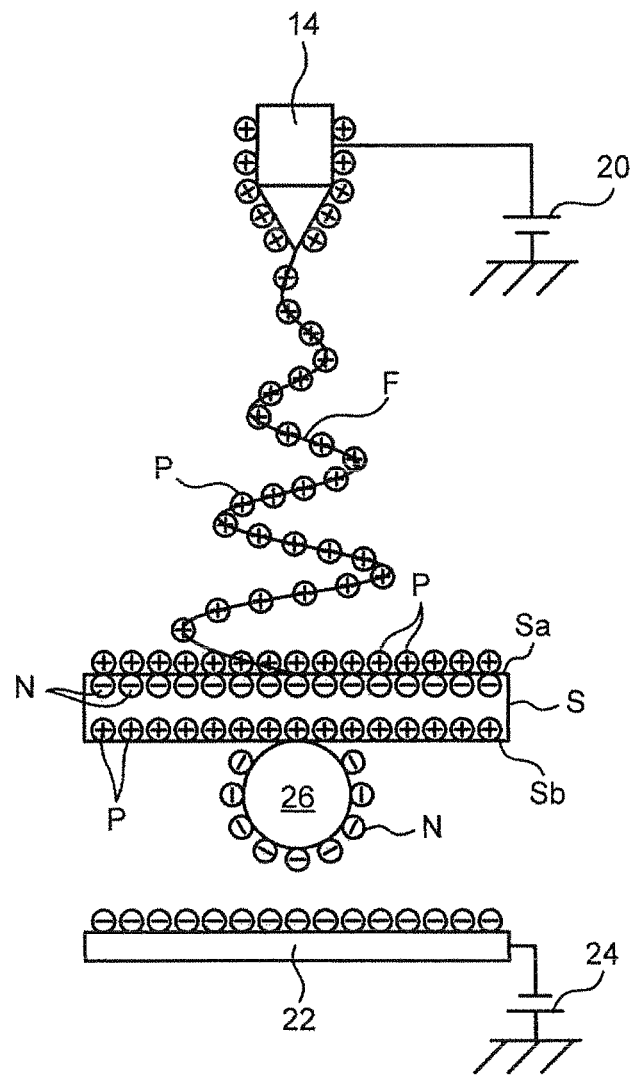

After the positively-charged fibers F are stacked on the front surface Sa of the base sheet S, the negatively-charged charge holding member 26 gets away from the electrode 22 of the collector device 16 by electrostatically attraction from the stacked and positively-charged fibers F. As shown in FIG. 2C, the negatively-charged charge holding member 26 then comes in contact with the back surface Sb of the base sheet S. Specifically, the negatively-charged charge holding member 26 comes in contact with a part of the back surface Sb of the base sheet S close to a part of the front surface Sa of the base sheet S having a high density of positive charges P (i.e., a part on which a lot of the positively-charged nanofibers F are stacked).

Figure 2D:
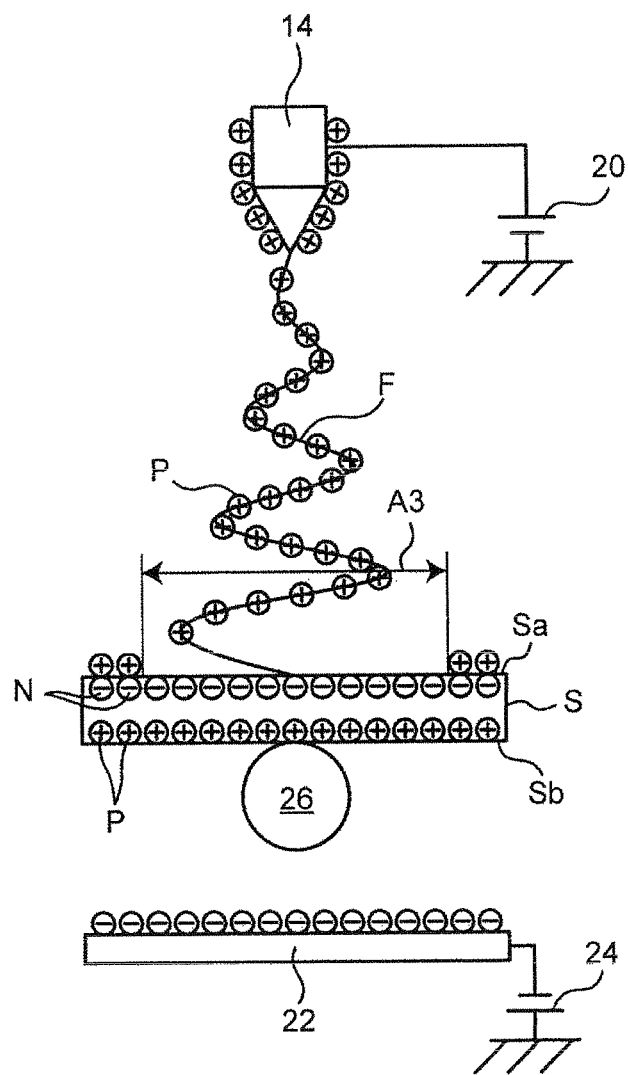

Since the negatively-charged charge holding member 26 comes in contact with the back surface Sb of the base sheet S, as shown in FIG. 2D, positive charges P on the front surface Sa of the base sheet S are eliminated. That is, the positively charged nanofibers F stacked on the front surface Sa of the base sheet S are electrically neutralized (an electrically-neutralized area A3 is generated on the front surface Sa of the base sheet S).

Figure 2E:
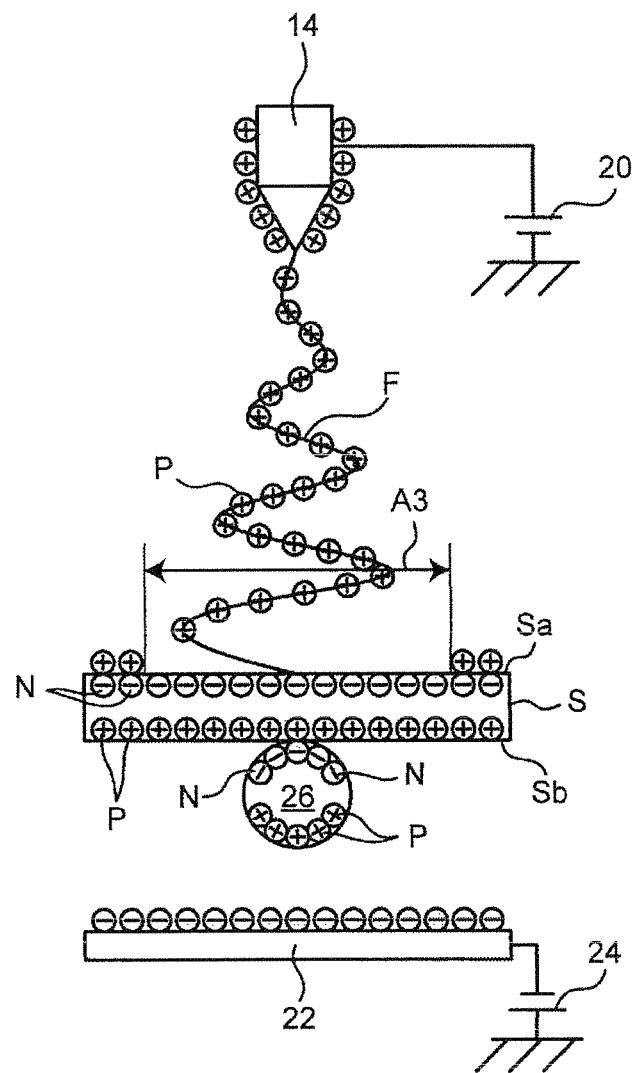

Since positively-charged fibers F stacked on the front surface Sa of the base sheet S are electrically neutralized, an electrostatic attraction for electrostatically attracting the charge holding member 26 to the base sheet S vanishes. A dielectric polarization is caused thereby in the charge holding member 26, as shown in FIG. 2E. Specifically, negative charges N are collected at one side of the charge holding member 26 contacting with the back surface Sb of the base sheet S, while positive charges P are collected at the opposite side thereof which is the electrode 22 side.

Figure 2F:
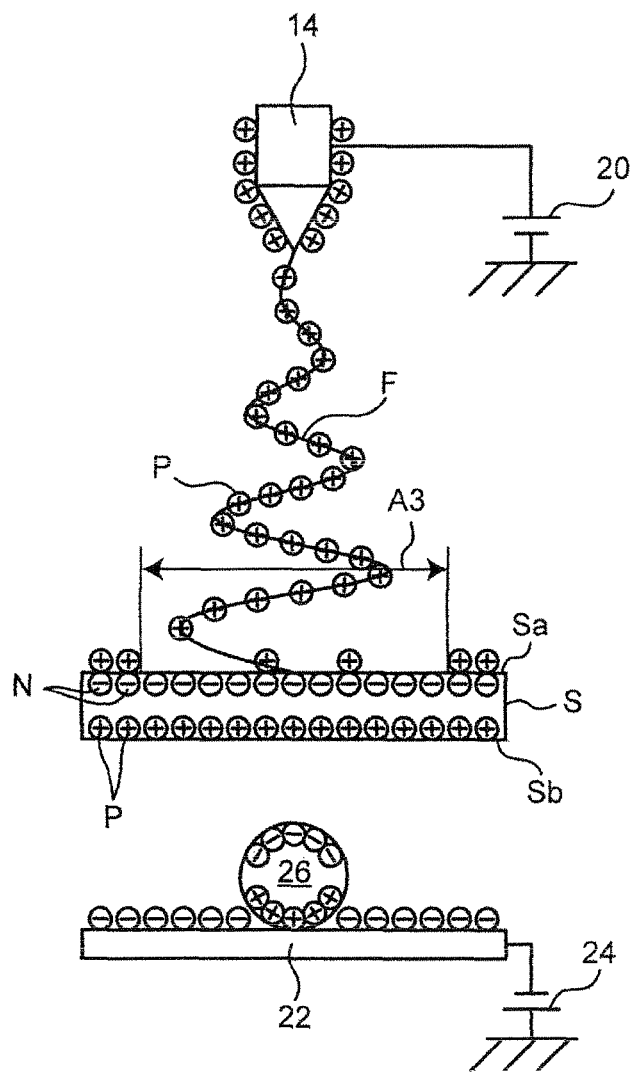

The charge holding member 26 in which the dielectric polarization is caused as shown in FIG. 2E, gets away from the back surface Sb of the base sheet S by mainly electrostatically attracting from the electrode 22 and secondarily attracting of gravity, and then comes in contact with the electrode 22 as shown in FIG. 2F. The charge holding member 26 is negatively re-charged by the electrode 22 supplied with a negative voltage.

If the charge holding member 26 has a high weight, when the electrostatically attraction for electrostatically attracting the charge holding member 26 to the back surface Sb of the base sheet S becomes smaller than gravity acting on the charge holding member 26 due to the electrically neutralizing of the charge holding member 26, the charge holding member 26 gets away from the back surface Sb of the base sheet S. That is, the charge holding member 26 gets away from the back surface Sb of the base sheet S by mainly attracting of gravity.

As shown in FIG. 2F, the electrically-neutralized area A3 is positively-charged and thus vanished by further fibers stacked thereon. On the other hand, the charge holding member 26 negatively re-charged (FIG. 2B) is electrostatically attracted to a different part strongly positively-charged of the base sheet S and then comes in contact with the back surface Sb of the base sheet S. Therefore, the contacted part is electrically neutralized. As just described, a series of actions shown in FIGS. 2B-2F are repeated until ejection of the fiber raw material liquid form nozzle 14 is shut down.

According to the collector device 16, the fibers F stacked on the front surface Sa of the base sheet S can be electrically neutralized in a state where the base sheet S is not substantially contacted with the collector device 16, i.e., without continuously plane-contacting with the collector device 16. Additionally, the collector device 16 can cause the dielectric polarization of the base sheet S. Since the collector device 16 and the base sheet S are not substantially contact with one another, the sheet feeding device 12 can readily feed the base sheet S, in comparison with a conventional collector device including a contact-type collecting electrode.

According to the non-woven fabric manufacturing apparatus 10 including the collector device 16, a tough non-woven fabric can be manufactured. The reason will be explained with reference to FIGS. 3-6.

Figure 3:
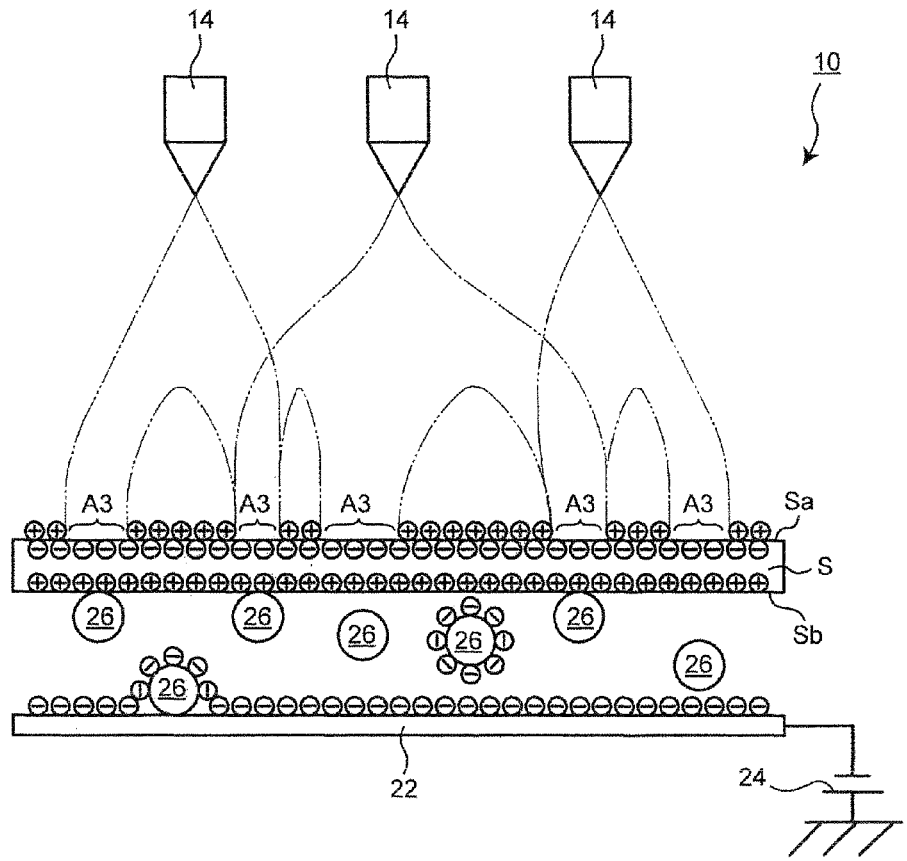
FIG. 3 is a view from a feeding direction of the base sheet for showing the base sheet in the non-woven fabric manufacturing apparatus comprising the collector device according to the embodiment of the present invention, FIG. 4. is a top-view of the base sheet in the non-woven fabric manufacturing apparatus comprising the collector device according to the embodiment of the present invention.
Figure 4:
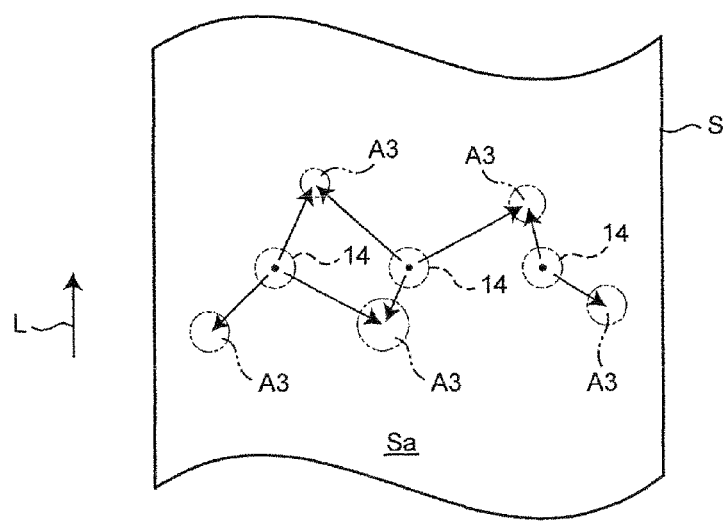
Figure 5:
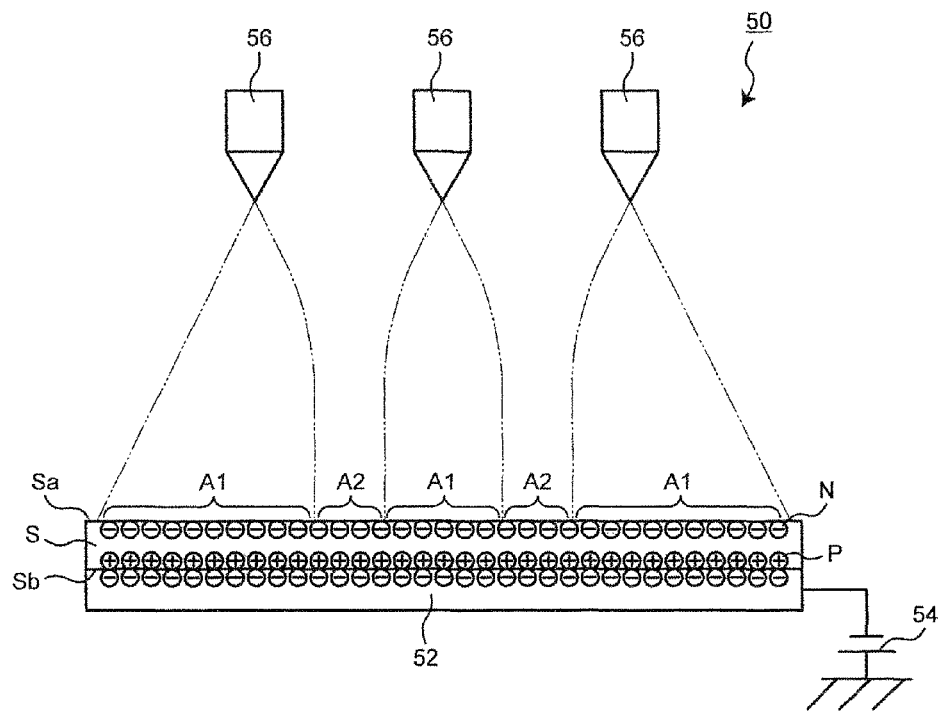
FIG. 5 is a view from a feeding direction of a base sheet for showing a non-woven fabric manufacturing apparatus comprising a collector device according to a comparison example.
Figure 6:
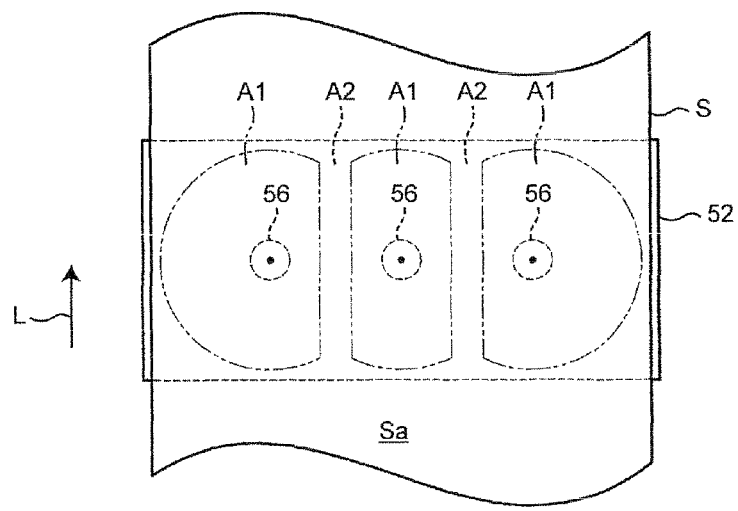
FIG. 6 is a top-view of the base sheet in the non-woven fabric manufacturing apparatus comprising the collector device according to the comparison example.

FIG. 3 is a view from a feeding direction of the base sheet S for showing the base sheet S in the non-woven fabric manufacturing apparatus 10 according to the embodiment of the present invention. FIG. 4 is a top-view of the base sheet S in the non-woven fabric manufacturing apparatus 10 according to the embodiment of the present invention. By contrast, FIG. 5 is a view from a feeding direction of a base sheet S for showing the base sheet S in a non-woven fabric manufacturing apparatus comprising a collector device according to a comparison example. FIG. 6 is a top-view of the base sheet S in the non-woven fabric manufacturing apparatus comprising the collector device according to the comparison example.

The non-woven fabric manufacturing apparatus 50 shown in FIG. 5, differing from the collector device 16 of the present invention, includes a collecting electrode 52 continuously plane-contacting with the entire back surface Sb of the base sheet S, a voltage supplying device 54 supplying the collecting electrode 52 with a voltage having a negative electrical polarity, and a plurality of nozzles 56 ejecting charged fiber raw material liquids toward the base sheet S.

As described above, the positively-charged fibers are stacked on the front surface Sa of the base sheet S. If the base sheet S is continuously plane-contacted with the electrode 52 as shown in FIG. 5, the charged fibers are electrically neutralized by the collecting electrode 52 right after stacked on the front surface Sa of the base sheet S. Consequently, density of positive charges is a uniform on the front surface Sa of the base sheet S.

Therefore, the fibers tend to be stacked on parts right below the nozzles 56. The parts are positions of the front surface Sa taking the shortest distance from positions for ejecting fibers. Additionally, the fibers, which made from fiber raw material liquids ejected from each of the nozzles 56, electrostatically repel each other. Due to these factors, the stacked areas, on which the fibers ejected from each of the nozzles 56 are stacked, take ellipsoidal shapes elongating in a direction (i.e., the feed direction of the base sheet S) perpendicular to an arrangement direction of the nozzles 56 (i.e., the width direction of the base sheet S). It causes problem that areas A1 on which the fibers are higher densely stacked and areas A2 on which the fibers are lower densely stacked tend to be interchangeably arranged in the arrangement direction of the nozzles 56 (i.e., the width direction of the base sheet S). Also, due to the stacked areas having ellipsoidal shapes, a lot of fibers are stacked with orienting in the feed direction. Therefore, the nonwoven fabric finally manufactured may be torn along the longitudinal direction, if the fabric is subjected to a tension along the width direction.

By contrast, In the non-woven fabric manufacturing apparatus 10, as shown in FIG. 3, density of positive charges P is not uniform on the front surface Sa of the base sheet S and thus differ depending on positions thereof. Specifically, density of positive charges P is low on the electrically-neutralized areas A3 which are areas right after having been electrically neutralized by the negatively-charged charge holding members 26. Since the charge holding members 26 are freely moveable between the base sheet S and the electrode 22, as shown in FIG. 4, the electrically-neutralized areas A3 are generated on the front surface Sa of the base sheet S in spots at random timings and at random positions (at random positions in the width and longitudinal directions).

The positively-charged fibers are moved toward the electrically-neutralized areas A3 in which density of positive charges P is low (positions at which fibers can be readily stacked) and then stacked on it. Therefore, as a result that the positions of the electrically-neutralized areas A3 are changed randomly, the positions at which the fibers stacked are changed randomly. In a conventional apparatus, a variation in density of fibers occurs since positions at which the fibers are easy to be stacked are not changed. By contrast, in the apparatus according to the present invention, a variation in density of fibers does not occur since positions of the electrically-neutralized areas A3 on which the fibers are easy to be stacked are changed. Therefore, the fibers are uniformly stacked on the entire front surface Sa of the base sheet S. As show in FIG. 4, since the electrically-neutralized areas A3 are circular, the fibers are stacked so that the fibers cover the circular area.

Consequently, it is suppressed that fibers are stacked with orienting in one direction as a conventional apparatus. Also, it sometimes happens that, after a new electrically-neutralized area A3 is generated on a circular area on which fibers ejected from one nozzle have been stacked, fibers ejected from another nozzle are stacked on the newly-generated area A3. By repeating this phenomenon at same position, fibers ejected from different nozzles complexly tangle with each other. Therefore, a tough non-woven fabric which has tear-resistant in all directions can be finally manufactured.

According to the embodiment, the base sheet S is not substantially contacted with the collector device 16, i.e., the base sheet S is not plane-contacted with the collector device 16 and not electrostatically attached to the collector device 16, thereby improving a feed capability of the base sheet S.

The present invention has been fully described hereinabove. However, the invention is not limited to the contents of the above description.

For example, the collector device according to the present invention can take various forms without limiting the collector device 16 as described above.

Figure 7:
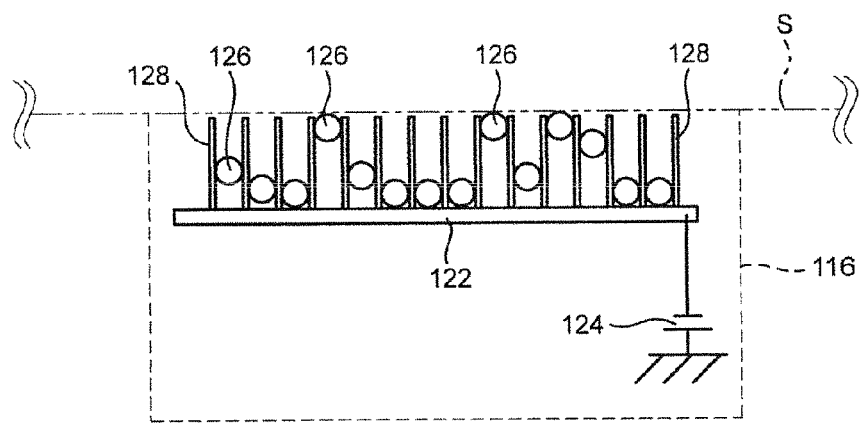
FIG. 7 is a schematic view of a non-woven fabric manufacturing apparatus comprising a collector device according to a different embodiment of the present invention.

For example, FIG. 7 is a view of a collector device 116 according to a different embodiment. The collector device 116 includes an electrode 122, a voltage supplying device 124 for supplying the electrode 122 with a voltage having a negative electrical polarity, a plurality of granular charge holding members 126, and guide members 128 for restricting moving directions of the charge holding members 126.

The guide members 128 are tubular members extending from the electrode 122 to the base sheet S and contain the charge holding members 126 therein. By the guide members 128, the charge holding members 126 are restricted respectively in moving direction thereof. Therefore, it is suppressed that the charge holding members 126 concentrate locally and thus agglomerate.

Focusing on one charge holding member 126, the one charge holding member 126 comes in contact with same part of the base sheet S. However, as well as the above embodiment, the electrically-neutralized areas A3 having low density of positive charges P as shown in FIG. 3 are generated at random timings. Therefore, the collector device 116 shown in FIG. 7 can function as well as the collector device 16 of the above embodiment.

Figure 8:
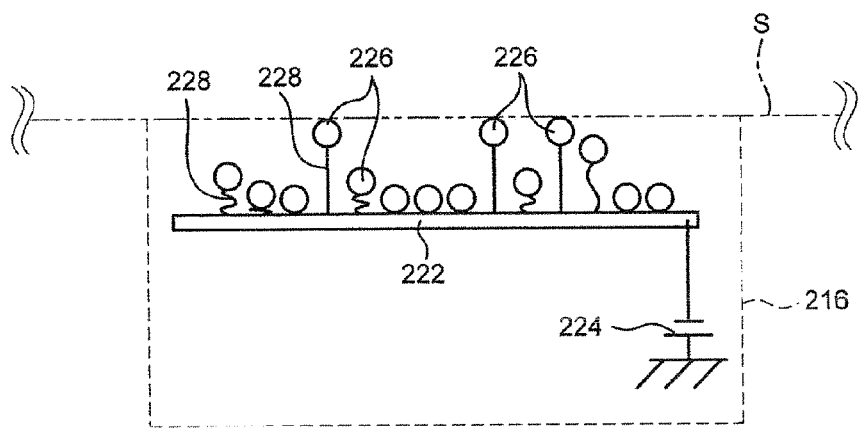
FIG. 8 is a schematic view of a non-woven fabric manufacturing apparatus comprising a collector device according to a further different embodiment of the present invention.

FIG. 8 is a view of a collector device 216 according to a further different embodiment. The collector device 216 includes an electrode 222, a voltage supplying device 224 for supplying the electrode 222 with voltage having a negative electrical polarity, a plurality of granular charge holding members 226, and threadlike members 228 for connecting the charge holding members 226 with the electrode 222.

The threadlike members 228 are freely deformable members and connect the charge holding members 226 with the electrode 222. The threadlike members 228 avoid the charge holding members 226 dropping out of the electrode 222 and function to keep the charge holding members 226 between the base sheet S and the electrode 222. That is, the container 28 can be eliminated.

The threadlike members 228 also are made from an insulating material. It prevents an occurrence of short circuit between the base sheet S and the electrode 222 through the threadlike members 228 when the charge holding members 226 come in contact with the base sheet S as shown in FIG. 8.

The collector device 216 shown in FIG. 8 can function as well as the collector device 16 of the above embodiment.

Figure 9:
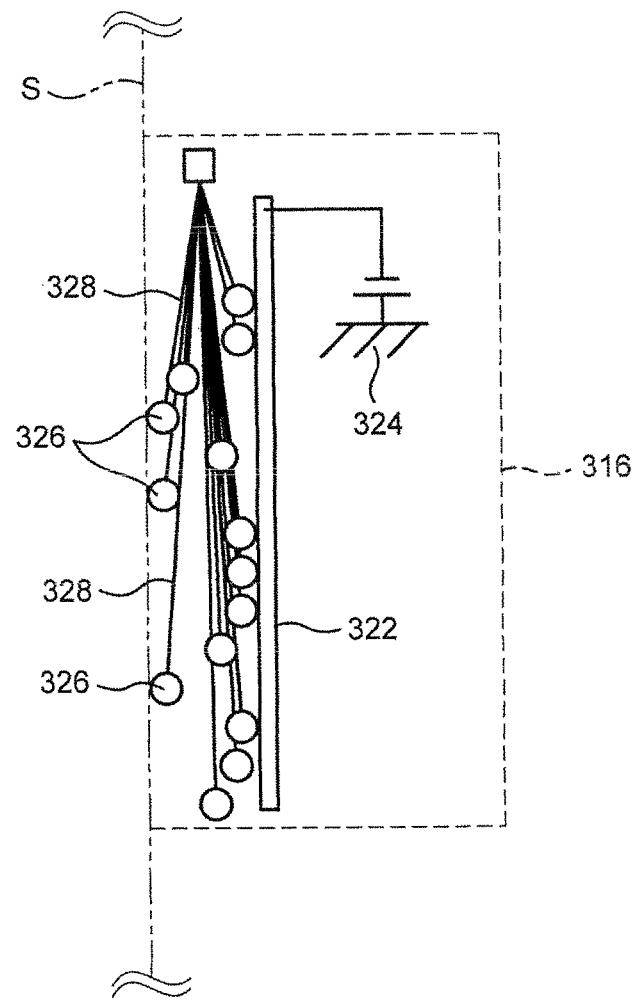
FIG. 9 is a schematic view of a non-woven fabric manufacturing apparatus comprising a collector device according to an another embodiment of the present invention.

FIG. 9 is a view of a collector device 316 according to an another embodiment. The collector device 316 includes an electrode 322, a voltage supplying device 324 for supplying the electrode 322 with a voltage having a negative electrical polarity, a plurality of granular charge holding members 326, and support members 328 for supporting the charge holding members 326 with suspending it.

The support members 328 are threadlike members includes free ends attached to the charge holding members 326 and fixed ends. During the non-woven fabric manufacturing apparatus is shut down (the voltage supplying devices for the nozzles and the electrode are shut down), the support members 328 support the charge holding members 326 so that the charge holding members 326 are positioned intermediary between the base sheet S and the electrode 322. Therefore, the charge holding members 326 are electrostatically attracted to and thus come in contact with the base sheet S by stacking of the positively-charged fibers on the base sheet S, and then electrostatically attracted to and thus come in contact with the electrode 322 after having electrically neutralized the stacked fibers. That is, the charge holding members 322 behave as a pendulum.

According to the collector device 316, fibers can be electrostatically attracted to a base sheet S extending in non-horizontal direction (e.g., vertical direction). The collector device 316 shown in FIG. 9 can function as well as the collector device 16 of the above embodiment.

Figure 10:
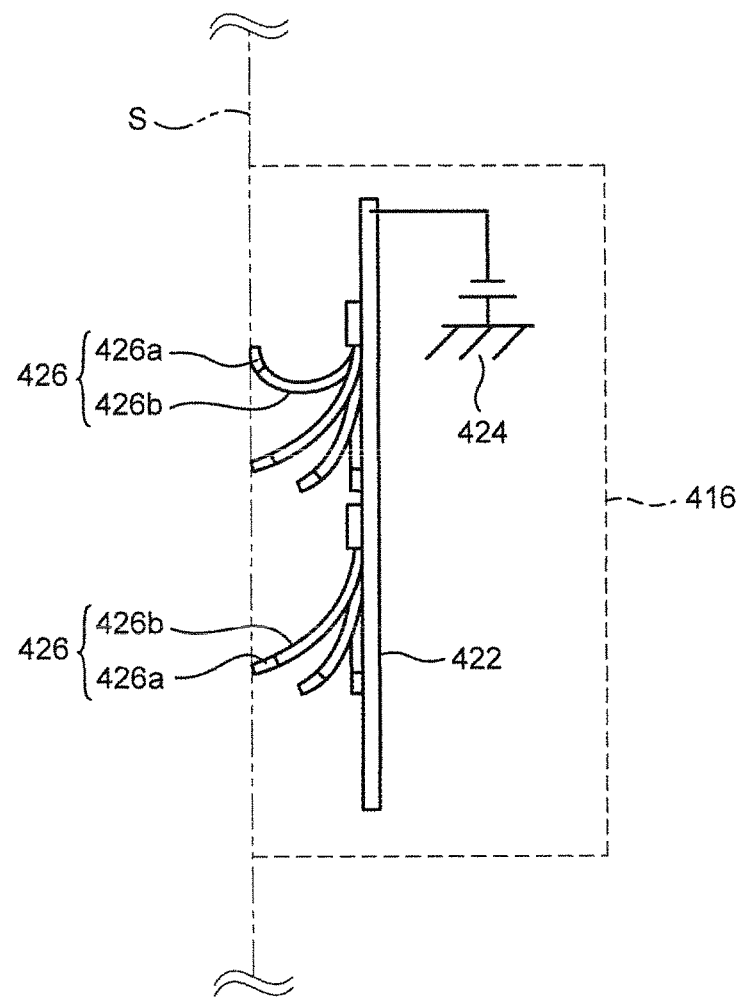
FIG. 10 is a schematic view of a non-woven fabric manufacturing apparatus comprising a collector device according to a further another embodiment of the present invention.

FIG. 10 is a view a collector device 416 according to a further another embodiment. The collector device 416 includes an electrode 422, a voltage supplying device 424 for supplying the electrode 422 with a voltage having a negative electrical polarity, and a plurality of strip-shaped or threadlike members 426.

The charge holding members 426 are strip-shaped or threadlike members having free ends contactable with the base sheet S and the electrode 422. Specifically, the charge holding members 426 consist of free ends 426a made by materials capable of holding charges and bodies 426b made from insulating materials. For, example, the charge holding members 426 are made by attaching metal materials to free ends of strip-shaped insulating members.

The collector device 416 with the charge holding members 426 can electrostatically attract the positively-charged fibers to the base sheet S taking any postures.

In the above described embodiments, the fibers (fiber raw material liquids) are positively-charged. Alternatively, the fibers may be negatively-charged. In this case, the electrode 22 of the collector device 16 is supplied with a voltage having a positive electrical polarity or grounded. Such collector device 16 can function as an attracting device for attracting (electrostatically attracting) the charged fibers (or the charged fiber raw material liquids) to the base sheet S, and a charging device for charging fiber raw material liquids by concentrating charges on the nozzles 14.

In the above described embodiments, the collector devices include a plurality of the charge holding members. Alternatively, the collector device may include one charge holding member. In the broad sense, figures, materials, and numbers of the charge holding members are not limited. If the charge holding members are capable to holding charges and thus moving by an influence from an electrostatically attraction. However, the charge holding members preferably are as light as possible so that the charge holding members can move from the electrode to the base sheet (e.g., move upward) by the influence of the electrostatically attraction. Also, the charge holding members preferably have the largest possible surface area so that the charge holding members can hold more charges and thus are influenced from stronger electrostatically attraction.

Although the present invention has been fully described in connection with the preferred embodiments thereof with reference to the accompanying drawings, it is to be noted that various changes and modifications are apparent to those skilled in the art. Such Changes and modifications are to be understood as included within the scope of the present invention as defined by the appended claims unless they depart therefrom.

The entire disclosures of Japanese Patent Application No. 2011-161175 filed on Jul. 22, 2011 including specification, claims, drawings, and summary are incorporated herein by reference in its entirety.

INDUSTRIAL APPLICABILITY

For example, the present invention is applicable even to a case in which fibers are stacked on front surfaces of a plurality of base sheets (i.e., a batch process is performed), other than cases as above described embodiments in which fibers are stacked on a front surface of a continuous base sheet fed in a longitudinal direction thereof. The present invention is applicable to apparatuses and methods in which charged fibers are electrostatically attracted to a base sheet by using of a collector device.

The invention claimed is:

1. A collector device of a non-woven fabric manufacturing apparatus for electrostatically attracting and stacking fibers charged at a first electrical polarity on a front surface of a base sheet, the collector device comprising:
   an electrode disposed to face a back surface of the base sheet at a distance, the electrode being supplied with a voltage having a second electrical polarity opposite to the first electrical polarity or grounded, and
   a plurality of charge holding members positioned between the base sheet and the electrode,
   wherein the charge holding members serially come in contact with and get away from the back surface of the base sheet at random.

2. The collector device according to claim 1, wherein the charge holding members come in contact with the back surface of the base sheet in spots.

3. The collector device according to claim 1, wherein the charge holding members are granular members.

4. The collector device according to claim 1, wherein the charge holding members are strip-shaped or threadlike members having free ends contactable with the base sheet and the electrode.

5. The collector device according to claim 1, further comprising tubular guide members extending from the electrode to the base sheet and restricting moving directions of the charge holding members by containing the charge holding members therein.

6. A non-woven fabric manufacturing apparatus for stacking fibers made by electrospinning on a front surface of a base sheet, the non-woven fabric manufacturing apparatus comprising:
   a sheet feeding device feeding the base sheet,
   a nozzle ejecting a polymer solution and disposed at a front surface side of the base sheet,
   an electrode disposed to face a base surface of the base sheet at a distance,
   a charging device charging the polymer solution ejected from the nozzle by supplying a potential difference between the nozzle and the electrode, and
   a plurality of charge holding members positioned between the base sheet and the electrode,
   wherein the charge holding members serially come in contact with and get away from the back surface of the base sheet at random.

7. The non-woven fabric manufacturing apparatus according to claim 6, wherein the charge holding members come in contact with the back surface of the base sheet in spots.

8. The non-woven fabric manufacturing apparatus according to claim 6, wherein the charge holding members are granular members.

9. The non-woven fabric manufacturing apparatus according to claim 6, wherein the charge holding members are strip-shaped or threadlike members having free ends contactable with the base sheet and the electrode.

10. The non-woven fabric manufacturing apparatus according to claim 6, further comprising tubular guide members extending from the electrode to the base sheet and restricting moving directions of the charge holding members by containing the charge holding members therein.

11. The non-woven fabric manufacturing apparatus according to claim 6, wherein the base sheet is above the electrode.

12. A non-woven fabric manufacturing method for stacking fibers made by electrospinning on a front surface of a base sheet, the non-woven fabric manufacturing method comprising:
   positioning a plurality of movable charge holding members between the base sheet and an electrode disposed to face a back surface of the base sheet at distance,
   stacking the fibers charged at a first electrical polarity by electrospinning on the front surface of the base sheet, by supplying the electrode with a voltage having a second electrical polarity opposite to the first electrical polarity or grounding the electrode,
   electrically neutralizing a part of the base sheet, and
   electrostatically attracting the fibers to the electrically-neutralized part of the base sheet,
   wherein the electrically neutralizing and electrostatically attracting are achieved by randomly repeating a cycle including;
   the charge holding members are charged at the second electrical polarity by the electrode,
   the charged charge holding members come in contact with the back surface of the base sheet, and
   the charge holding members get away from the back surface of the base sheet in order to be re-charged by the electrode.

13. The non-woven fabric manufacturing method according to claim 12, wherein the charge holding members come in contact with the back surface of the base sheet in spots.

14. The non-woven fabric manufacturing method according to claim 12, wherein the charge holding members are granular members.

15. The non-woven fabric manufacturing method according to claim 12, wherein the charge holding members are strip-shaped or threadlike members having free ends contactable with the base sheet and the electrode.

16. The non-woven fabric manufacturing method according to claim 12, further using tubular guide members extending from the electrode to the base sheet and restricting moving directions of the charge holding members by containing the charge holding members therein.

* * * * *